United States Patent
Kato

(10) Patent No.: US 8,196,467 B2
(45) Date of Patent: Jun. 12, 2012

(54) ANGULAR VELOCITY DETECTING METHOD

(75) Inventor: Kenji Kato, Okazaki (JP)

(73) Assignee: DENSO CORPORATION, Kariya (JP)

(*) Notice: Subject to any disclaimer, the term of this patent is extended or adjusted under 35 U.S.C. 154(b) by 422 days.

(21) Appl. No.: 12/588,949

(22) Filed: Nov. 3, 2009

(65) Prior Publication Data

US 2010/0107759 A1    May 6, 2010

(30) Foreign Application Priority Data

Nov. 5, 2008   (JP) .................... 2008-284378

(51) Int. Cl.
  *G01P 9/04*   (2006.01)
  *G01C 19/56*   (2006.01)
(52) U.S. Cl. .............. 73/504.12; 73/501.14; 73/1.37
(58) Field of Classification Search ........... 73/504.12, 73/504.14, 504.15, 504.16, 504.04, 504.02, 73/1.37
  See application file for complete search history.

(56) References Cited

U.S. PATENT DOCUMENTS

| | | | |
|---|---|---|---|
| 5,287,745 A | 2/1994 | Dalla-Piazza | |
| 5,806,364 A * | 9/1998 | Kato et al. | 73/504.12 |
| 6,786,094 B2 * | 9/2004 | Konaka et al. | 73/504.14 |
| 6,796,180 B2 * | 9/2004 | Katsumata | 73/504.14 |
| 7,107,841 B2 * | 9/2006 | Mori | 73/504.12 |
| 7,284,408 B2 * | 10/2007 | Kato | 73/1.37 |
| 7,513,140 B2 * | 4/2009 | Kato | 73/1.37 |
| 2005/0274181 A1 | 12/2005 | Kutsuna et al. | |

FOREIGN PATENT DOCUMENTS

| | | |
|---|---|---|
| JP | A-5-149964 | 6/1993 |
| JP | A-2003-28642 | 1/2003 |
| JP | 2003-83751 A | 3/2003 |
| JP | A-2008-58212 | 3/2008 |

OTHER PUBLICATIONS

Office Action mailed Aug. 17, 2010 issued from the Japan Patent Office for corresponding Japanese patent application No. 2008-284378 (Verified English translation enclosed).
Notice of Reasons for Refusal issued from the Japanese Patent Office on Aug. 17, 2010 in the corresponding Japanese patent application No. 2008-284378 (with English translation).

* cited by examiner

*Primary Examiner* — Helen C. Kwok
(74) *Attorney, Agent, or Firm* — Posz Law Group, PLC

(57) ABSTRACT

In a method of detecting an angular velocity $V_\Omega$ of an angular velocity sensor including a vibrating body, a monitoring signal Vm(t) sensing a displacement of the vibrating body in a first direction and a sensing signal Vs(t) sensing a displacement of the vibrating body in a second direction crossing the first direction are detected. A difference in time between a first feature point where the monitoring signal Vm(t) crosses a first reference level and a second feature point where the sensing signal Vs(t) crosses a second reference level is set as $\Delta t$, a sensing direct-current voltage corresponding to an amplitude of the sensing signal Vs(t) is set as Vsd, a driving frequency is set as fd, and the angular velocity $V_\Omega$ is calculated from formula of $V_\Omega = Vsd \times \sin(2 \cdot \pi \cdot fd \cdot \Delta T)$.

4 Claims, 5 Drawing Sheets

US 8,196,467 B2

ANGULAR VELOCITY DETECTING METHOD

CROSS REFERENCE TO RELATED APPLICATIONS

The present application is based on and claims priority to Japanese Patent Application No. 2008-284378 filed on Nov. 5, 2008, the contents of which are incorporated in their entirety herein by reference.

BACKGROUND OF THE INVENTION

1. Field of the Invention

The present invention relates to a method of detecting angular velocity of an angular velocity sensor including a vibrating body.

2. Description of the Related Art

Conventionally, an angular velocity sensor including a vibrating body is used for detecting a rotation of a vehicle or a slip of a vehicle. For example, in a vehicle stability control system or a four-wheel steering angle control system, a slip of a vehicle is detected based on an angular velocity signal detected by an angular velocity sensor. When an abnormality of the vehicle such as a slip is detected, a brake is controlled so as to enable a driving safety.

JP-A-2008-58212 discloses an angular, velocity sensor that detects an angular velocity signal by vibrating a vibrating body in a driving-axis direction and detecting a signal generated in accordance with a displacement of the vibrating body in a detecting-axis direction crossing the driving-axis direction.

The above-described angular velocity sensor executes a high-speed analog-digital conversion process for a sine wave at a resonant frequency of the vibrating body and executes a digital signal process so that a high-accuracy angular velocity signal can be obtained.

However, because the above-described angular velocity sensor requires a high-speed analog-digital converter, the above-described angular velocity sensor is difficult to be configured by an inexpensive microcomputer. Thus, the above-described angular velocity sensor may not meet a requirement of a price reduction.

SUMMARY OF THE INVENTION

In view of the foregoing problems, it is an object of the present invention is to provide a method of detecting an angular velocity of an angular velocity sensor including a vibrating body.

According to an aspect of the present invention, in a method of detecting an angular velocity $V_\Omega$ of an angular velocity sensor including a vibrating body, a monitoring signal $Vm(t)$ sensing a displacement of the vibrating body in a first direction and a sensing signal $Vs(t)$ sensing a displacement of the vibrating body in a second direction crossing the first direction are detected. A difference in time between a first feature point where the monitoring signal $Vm(t)$ crosses a first reference level and a second feature point where the sensing signal $Vs(t)$ crosses a second reference level is set as $\Delta t$, a sensing direct-current voltage corresponding to an amplitude of the sensing signal $Vs(t)$ is set as $Vsd$, a driving frequency is set as $fd$, and the angular velocity $V_\Omega$ is calculated from formula of $V_{\Omega=Vsd} \times \sin(2 \cdot \pi \cdot fd \cdot \Delta T) \ldots (1)$.

In the above-described method, the angular velocity $V_\Omega$ can be calculated without a high-speed analog-digital converter.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

A method of detecting an angular velocity of an angular velocity sensor according to an exemplary embodiment of the present invention will be described below.

Figure 1:
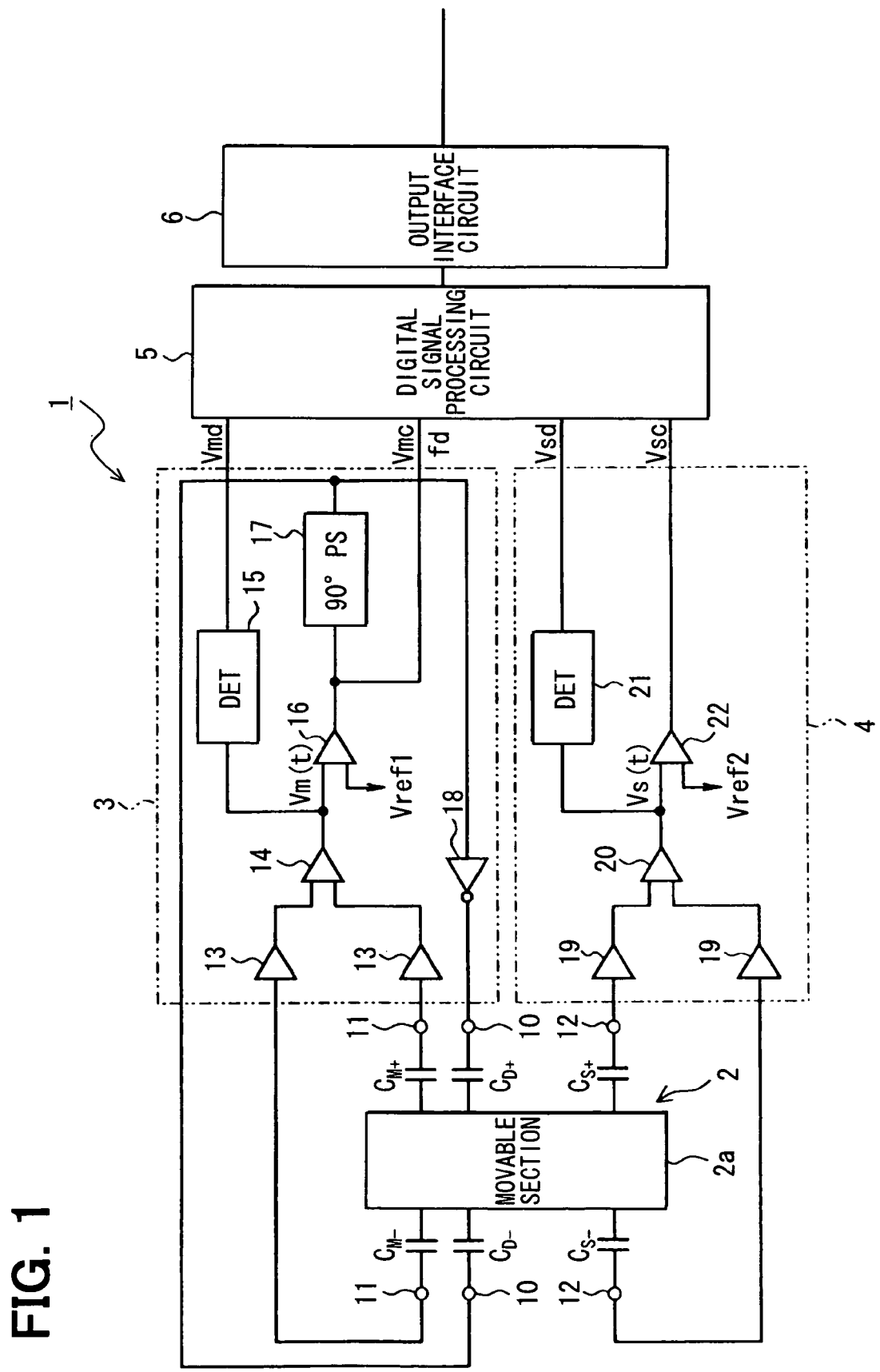
FIG. 1 is a block diagram illustrating a angular velocity sensor according to an exemplary embodiment of the present invention.

As illustrated in FIG. 1, the angular velocity sensor 1 includes a vibrating body 2, a driving circuit 3, a sensing circuit 4, a digital signal processing circuit 5, and an output interface circuit 6. The output interface circuit 6 outputs an angular velocity signal.

Figure 2:
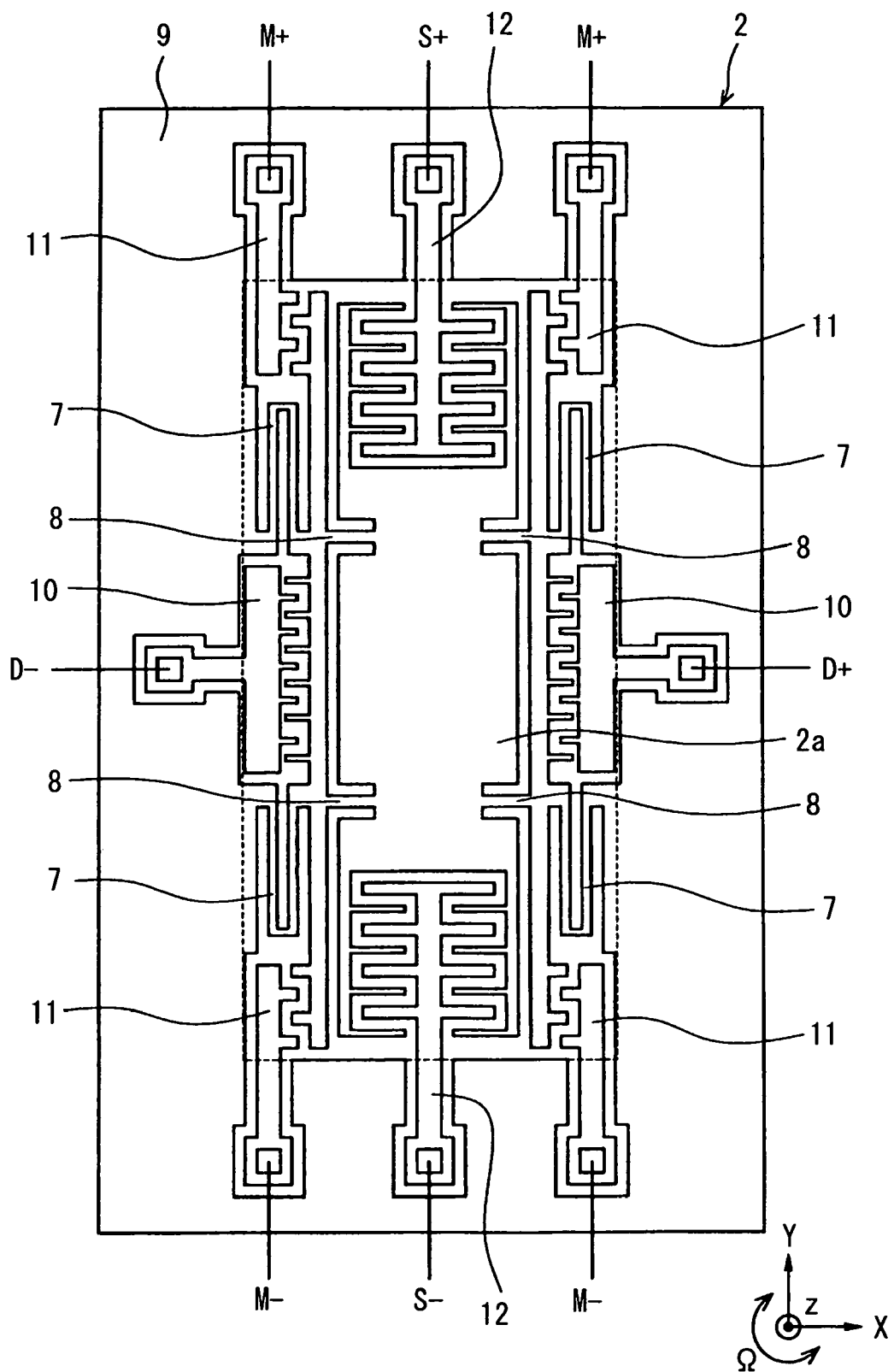
FIG. 2 is a diagram illustrating a plan view of a vibrating body in the angular velocity sensor.

As illustrated in FIG. 2, the vibrating body 2 is made of, for example, a silicon-on-insulator (SOI) substrate. The SOI substrate can be formed by attaching two silicon thin layers through an oxide layer. The movable section 2a can be formed by removing a part of the oxide layer disposed between the two silicon layers. The movable section 2a is held by a base section 9 through driving beams 7 and sensing beams 8. The driving beams 7 are elastically deformable in an X-axis direction shown in FIG. 2. The sensing beams 8 are elastically deformable in a Y-axis direction perpendicular to the X-axis direction.

Between the movable section 2a and the base section 9, island-shaped driving electrodes 10 are disposed on opposite sides of a center portion of the movable section 2a in the X-axis direction. The driving electrode 10 disposed to a right side of the-movable section 2a has a comb-shaped electrode at a left end portion thereof, and the comb-shaped electrode has a plurality of teeth extending in a left direction. The driving electrode 10 disposed to a left side of the movable section 2a has a comb-shaped electrode at a right end portion thereof, and the comb-shaped electrode has a plurality of teeth extending in a right direction.

In addition, between the movable section 2a and the base section 9, four island-shaped monitor electrodes 11 are disposed adjacent to four corner portions of the movable section 2a so as to be spaced from the movable section 2a. The two monitor electrodes 11 disposed to the right side of the movable section 2a are disposed on opposite sides in the Y-axis direction of the driving electrode 10 disposed to the right side of the movable section 2a, and the two monitor electrodes 11 are spaced from the driving electrode. 10. Each of the two monitor electrodes 11 has a comb-shaped electrode at a left end portion thereof, and the comb-shaped electrode has a plurality of teeth extending in the left direction.

The two monitor electrodes 11 disposed to the left side of the movable section 2a are disposed on, opposite sides in the Y-axis direction of the driving electrode 10 disposed to the left side of the movable section 2a, and the two monitor electrodes 11 are spaced from the driving electrode 10. Each of the two monitor electrodes 11 has a comb-shaped electrode at a right end portion thereof, and the comb-shaped electrode has a plurality of teeth extending in the right direction.

Furthermore, between the movable section 2a and the base section 9, island-shaped sensing electrodes 12 are disposed on opposite sides of a center portion of the movable section 2a in the Y-axis direction so as to be spaced from the movable section 2a. The sensing electrode 12 disposed to a front side of the movable section 2a has a comb-shaped electrode at a rear end portion thereof, and the comb-shaped electrode has a plurality of teeth extending in the right direction and a plurality of teeth extending in the left direction. The sensing electrode 12 disposed to a rear side of the movable section 2a has a comb-shaped electrode at a front end portion thereof, and the comb-shaped electrode has a plurality of teeth extending in the right direction and a plurality of teeth extending in the left direction.

The movable section 2a has comb-shaped electrodes at a right end portion and a left end portion thereof, and each of the comb-shaped electrodes has a plurality of teeth extending in the X-axis direction. A part of the comb-shaped electrodes of the movable section 2a are opposite the comb-shaped electrodes of the driving electrodes 10, and the teeth of the movable section 2a are spaced from the teeth of the driving electrodes 10 in the Y-axis direction. Other part of the comb-shaped electrodes of the movable section 2a is opposite the comb-shaped electrodes of the monitor electrodes 11, and the teeth of the movable section 2a are spaced from the teeth of the monitor electrodes 11. The movable section 2a further has comb-shaped electrodes at a front end portion and a rear end portion thereof, and each of the comb-shaped electrodes has a plurality of teeth extending in the X-axis direction. The comb-shaped electrodes of the movable section 2a are opposite the comb-shaped electrodes of the sensing electrodes 12, and teeth of the movable section 2a are spaced from the teeth of the sensing electrodes 12 in the Y-axis direction.

When the driving electrodes 10 are applied with driving signals D+ and D−, the movable section 2a capacitively-coupled with the driving electrodes 10 vibrates in the X-axis direction through the driving beams 7. Then the movable section 2a vibrates in the X-axis direction, monitoring signals M+ and M− are applied to the monitor electrodes 11 capacitively-coupled with the movable section 2a through the comb-shaped electrodes of the movable section 2a. By detecting the monitoring signals M+ and M− of the monitor electrodes 11, a vibrational frequency and a vibrational amplitude of the movable section 2a can be detected. The detected result is fed back to the driving signals D+ and D− applied to the driving electrodes 10, and thereby the driving signals D+ and D− are controlled.

When the movable section 2a is applied with an angular velocity S2 around a Z-axis perpendicular to the X-axis and the Y-axis in a state where the movable section 2a vibrates in the X-axis direction, Coriolis force generates in the. Y-axis direction. Then, the sensing beams 8 are bent and the movable section 2a vibrates in the Y-axis direction. The sensing electrodes 12 detect the vibration of the movable section 2a in the Y-axis direction by detecting a change in capacity between the comb-shaped electrodes.

As illustrated in FIG. 1, the monitor electrode 11 and the driving electrodes 10 are coupled with the driving circuit 3. The driving circuit 3 and the vibrating body 2 configurates a self-vibration driving mechanism. The driving circuit 3 includes charge-voltage converting circuit 13, a differential amplifier circuit 14, a detecting circuit 15, a comparator 16, a phase shifting circuit 17, and an inverting circuit 18. The charge-voltage converting circuits 13 are coupled with the monitor electrodes 11. The inverting circuit 18 inverts an output signal of the phase shifting circuit 17.

The charge-voltage converting circuits 13 detect changes in capacities between the comb-shaped electrodes of the movable section 2a and the monitor electrodes 11 and output detected results to the differential amplifier circuit 14. The differential amplifier circuit 14 differentially amplifies changes in voltages of the charge-voltage converting circuits 13 and outputs an amplified signal as a monitoring signals Vm(t) to the detecting circuit 15 and the comparator 16.

The detecting circuit 15 is configured by, for example, a peak hold circuit. The detecting circuit 15 detects a maximum amplitude voltage by converting alternating current of the monitoring signal Vm(t) to direct current, and thereby the detecting circuit 15 detects a monitoring direct-current voltage Vmd corresponding to an amplitude of the monitoring signal Vm(t). Then, the monitoring direct-current voltage Vmd is treated with an analog-digital conversion process and is processed in the digital signal processing circuit 5 as a digital signal having a predetermined bit corresponding to the amplitude of the monitoring signal Vm(t).

The comparator 16 compares the monitoring signal Vm(t) with a predetermined first threshold voltage Vref1 and outputs a comparison signal Vmc to the digital signal processing circuit 5 as a digital signal at a high level or a low level in accordance with the compared result. The first threshold voltage Vref1 corresponds to a first reference level. When a source voltage is 5 V, the first threshold voltage is set to be 2.5 V, for example. The comparison signal Vmc is also output to the phase shifting circuit 17. The phase shifting circuit 17 shifts a phase of the comparison signal Vmc by 90 degrees and applies a shifted signal to one of the driving electrodes 10 as the driving signal. The inverting circuit 18 inverts the shifted signal and applies an inverted signal to the other one of the driving electrodes 10 as the driving signal. The self-vibration driving mechanism is provided by the above-described feedback circuit. The movable section 2a of the vibrating body 2 vibrates in the X-axis direction at a predetermined resonant frequency. The vibration of the movable section 2a in the X-axis direction is maintained.

The sensing circuit 4 includes charge-voltage converting circuits 19, a differential amplifier circuit 20, a detecting circuit 21, and a comparator 22. The charge-voltage converting circuits 19 are coupled with the detecting electrodes 12. The charge-voltage converting circuits 19 convert changes in capacities between the comb-shaped electrodes of the movable section 2a and the detecting electrodes 12 to voltages and output detected voltages to the differential amplifier circuit 20.

The differential amplifier circuit 20 differentially amplifies changes in voltages of the charge-voltage converting circuits 19 and outputs an amplified signal as a sensing signal Vs(t) to the detecting circuit 21 and the comparator 22. The detecting circuit 21 is configured by, for example, a peak hold circuit. The detecting circuit 21 detects a sensing direct-current voltage Vsd corresponding to an amplitude of the sensing signal Vs(t) by converting alternating current of the sensing signal Vs(t) to direct current. Then, the sensing direct-current voltage Vsd is treated with an analog-digital conversion process and is processed in the digital signal processing circuit 5 as a digital signal having a predetermined bit corresponding to the amplitude of the sensing signal Vs(t).

The comparator 22 compares the sensing signal Vs(t) with a predetermined second threshold voltage Vref2 and outputs a comparison signal Vsc to the digital signal processing circuit 5 as a digital signal at a high level or a low level in accordance with the compared result. The second threshold voltage Vref2 corresponds to a second reference level. The digital signal processing circuit 5 is configured by, for example, a microcomputer. An output terminal of the digital signal processing circuit 5 is coupled with the output interface circuit 6. The digital signal processing circuit 5 outputs an angular velocity $V_\Omega$ to the output interface circuit 6.

A calculation principle in a case where the digital signal processing circuit 5 calculates the angular velocity will be described below. The digital signal processing circuit 5 receives the analog-digital converted value of the monitoring direct-current voltage Vmd corresponding to the amplitude of the monitoring signal Vm(t) and the analog-digital converted value of the sensing direct-current voltage Vsd corresponding to the amplitude of the sensing signal Vs(t). In addition, the digital signal processing circuit 5 receives the comparison signal Vmc from the comparator 16 and the comparison signal Vsc from the comparator 22. The comparison signal Vmc is a timing signal where the monitoring signal Vm(t) crosses the first threshold value Vref1. The comparison signal Vsc is a timing signal where the sensing signal Vs(t) crosses the second threshold value Vref2.

The monitoring signal Vm(t) can be expressed as:

$$Vm(t) = Vmd \cdot \sin(2\pi \cdot fd \cdot t) \qquad (2)$$

where "fd" is a driving frequency, Vm(t) is a signal corresponding to a displacement in the X-axis direction, and Vmd is an amplitude voltage.

An X-axis direction velocity of an object having a mass "m" can be expressed as "/v" using a vector "v." When the angular velocity Ω generates around the Z axis, Coriolis force "2·m·(/Ω×/v)" is applied in the Y-axis direction, where "/Ω" is Ω vector around the Z-axis and "×" expresses a cross product. Thus, the angular velocity signal $V_\Omega(t)$ due to the Coriolis force can be expressed as:

$$V_\Omega(t) = 2 \cdot m \cdot |/\Omega| \cdot (dVm(t)/dt) \qquad (3)$$

$$= 4\pi \cdot m \cdot |/\Omega| \cdot Vmd \cdot fd \cdot \cos(2\pi \cdot fd \cdot t).$$

Figures 4A, 4B, 4C, 4D, 4E, 4F:
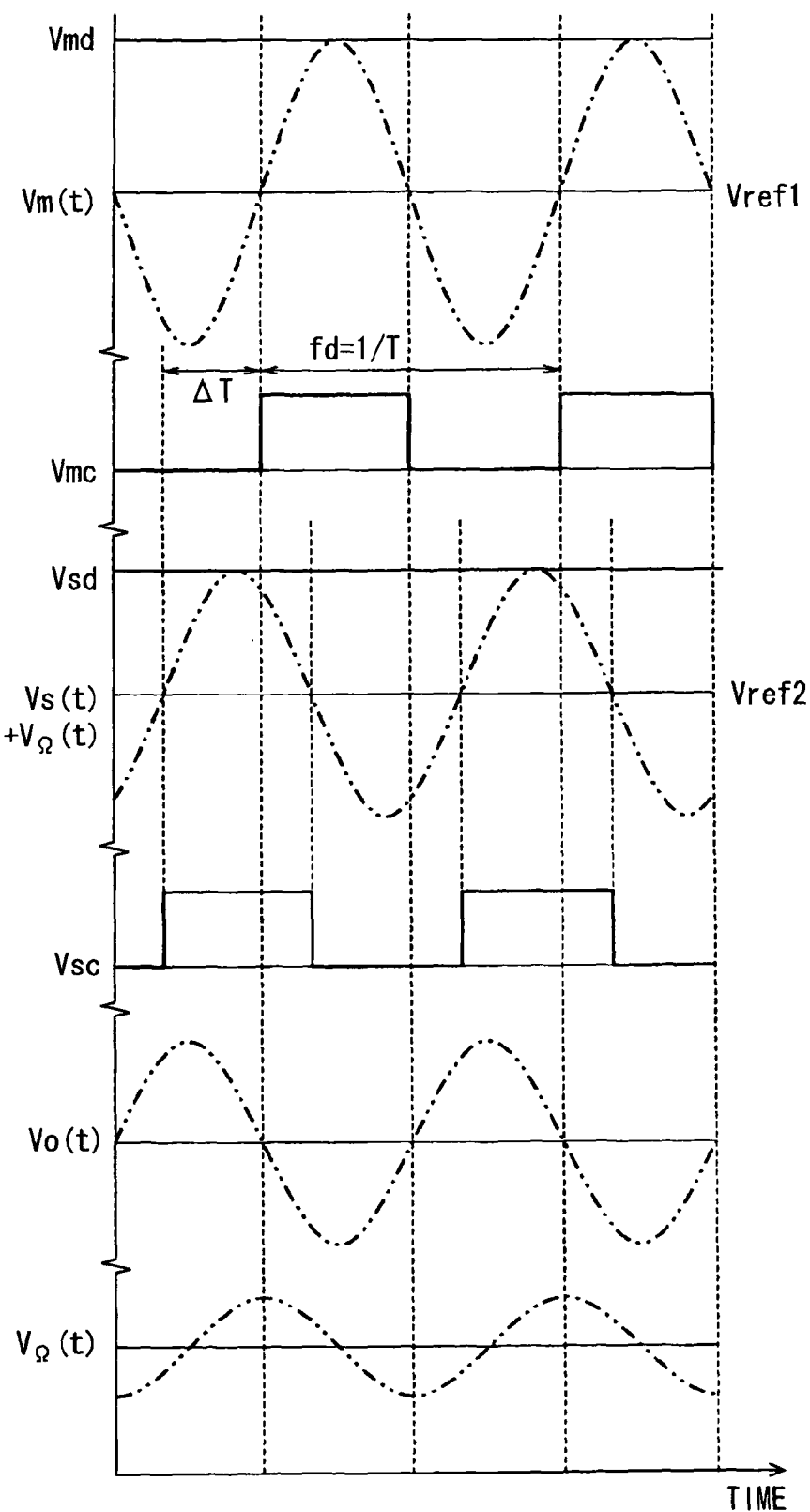
FIG. 4A is a diagram illustrating waveforms of a monitoring signal $Vm(t)$ and a monitoring direct-current voltage $Vmd$ corresponding to an amplitude of the monitoring signal $Vm(t)$.
FIG. 4B is a diagram illustrating a waveform of a comparison signal $Vmc$ of a comparator in a driving circuit.
FIG. 4C is a diagram illustrating waveforms of a sensing signal $Vs(t)$ and a sensing direct-current voltage $Vsd$ corresponding to an amplitude of the sensing signal $Vs(t)$.
FIG. 4D is a diagram illustrating a waveform of a comparison signal $Vsc$ of a comparator in a sensing circuit.
FIG. 4E is a diagram illustrating a waveform of an undesired signal $V_o(t)$.
FIG. 4F is a diagram illustrating a waveform of an angular velocity signal $V_\Omega(t)$.

Thus, an amplitude of the angular velocity signal $V_\Omega(t)$ is proportional to (Vmd·fd) and a phase of the angular velocity signal $V_\Omega(t)$ is different from the monitoring signal Vm(t) by 90 degrees as illustrated in FIG. 4A and FIG. 4F.

In theory, the above-described signal can be obtained. However, an actual sensing signal Vs(t) includes an undesired signal $V_o(t)$ that generates due to, for example, a dimension error of the vibrating body 2. The undesired signal $V_o(t)$ is mainly caused by an acceleration component of the driving vibration of the vibrating body 2. The undesired signal $V_o(t)$ can be expressed as:

$$V_o(t) \propto m \cdot (d^2 Vm(t)/dt^2) \propto -m \cdot Vmd \cdot (2\pi \cdot fd)^2 \cdot \sin(2\pi \cdot fd \cdot t) \qquad (4).$$

Figure 5:
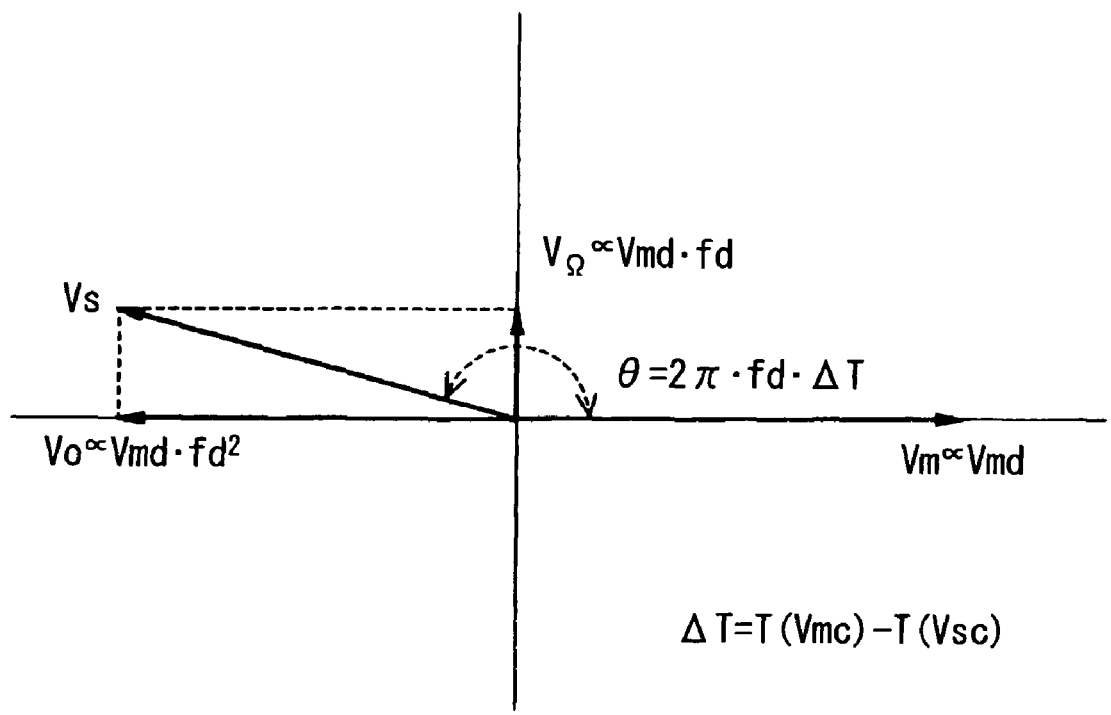
FIG. 5 is a diagram schematically illustrating phase relationships between the signals in a vector coordinate.

An amplitude of the undesired signal $V_o(t)$ is proportional to (Vmd·fd$^2$). The undesired signal $V_o(t)$ and the monitoring signal Vm(t) have opposite phases as illustrated in FIG. 4A and FIG. 4E. FIG. 5 is a graph schematically illustrating phase relationships between the signals in a vector coordinate.

Considering the undesired signal $V_o(t)$, the actual sensing signal Vs(t) is a synthesized signal of the ideal angular velocity signal $V_\Omega(t)$ and the undesired signal $V_o(t)$. Thus, the sensing direct-current voltage Vsd corresponding to the amplitude of the sensing signal Vs(t) can be expressed as:

$$\begin{aligned} Vsd &= ((Vmd \cdot fd)^2 + Vmd^2 \cdot fd^4)^{1/2} \\ &= Vmd \cdot fd \cdot (1 + fd^2)^{1/2} \\ &\approx Vmd \cdot fd^2 \end{aligned} \qquad (5)$$

(where $fd^2 \gg 1$).

The sensing direct-current voltage Vsd corresponding to the amplitude of the detecting signal is substantially proportional to the amplitude of the undesired signal $V_o(t)$. The amplitude of the angular velocity signal $V_\Omega(t)$ is proportional to (Vmd·fd). Thus, a sensitivity of the angular velocity signal $V_\Omega(t)$ can be compensated by being multiplied by a factor of (Vmd0/Vmd)×(fd0/fd), where Vmd0 is the amplitude Vmd of the monitoring signal Vm at a time when a sensitivity is previously adjusted, and "fd0" is the driving frequency "fd" at a time when the sensitivity is previously adjusted.

Therefore, the angular velocity $V_\Omega$ corresponding to the amplitude of the angular velocity signal $V_\Omega(t)$ can be expressed as:

$$V_\Omega = (Vmd0/Vmd) \times (fd0/fd)^2 \times Vsd \times \sin(2\pi \cdot fd \cdot \Delta T) \text{ (where } \Delta T = T(Vmc) - T(Vsc)) \qquad (6).$$

Figure 3:
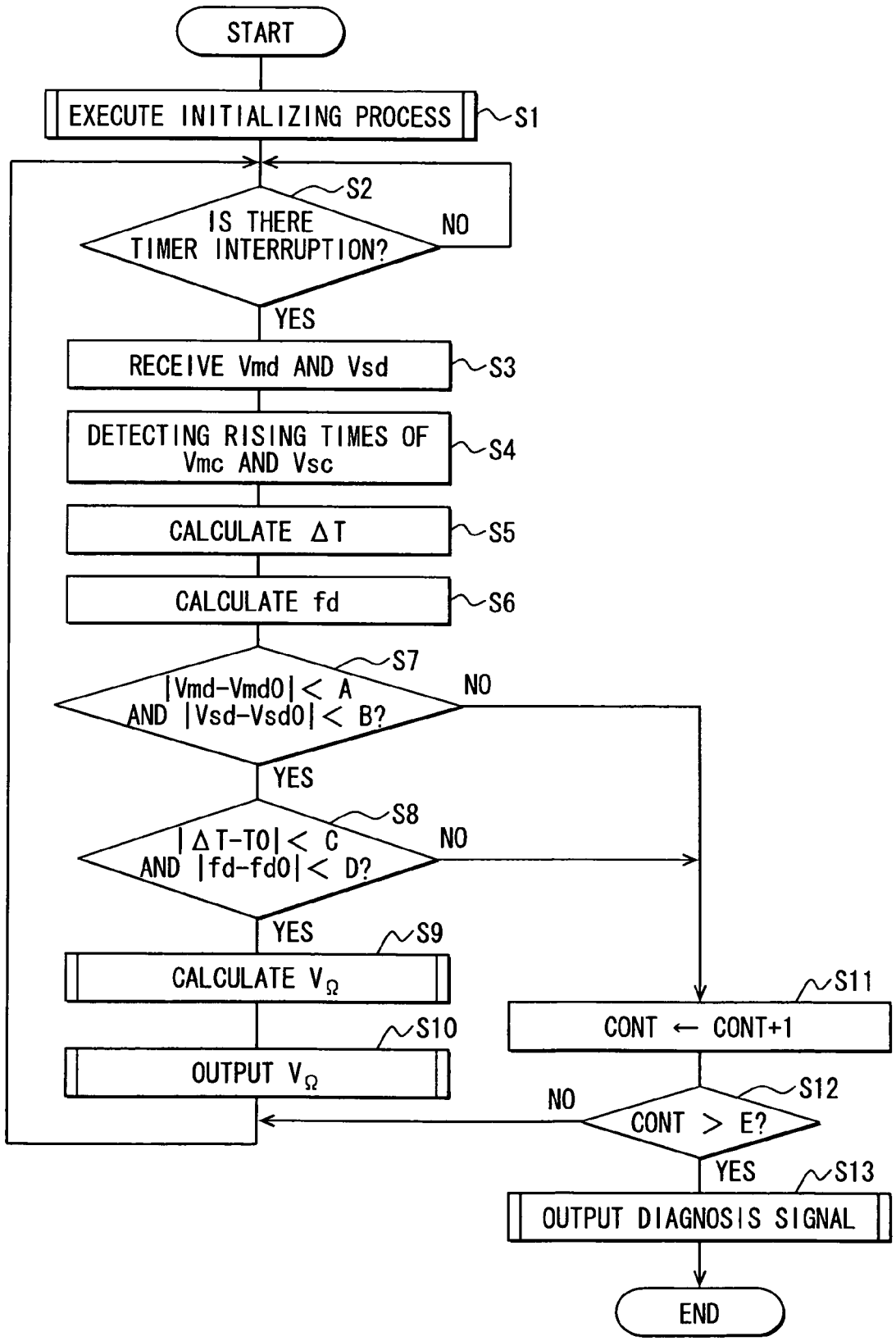
FIG. 3 is a flowchart illustrating a process performed by a digital signal processing circuit in the angular velocity sensor.

Thus, in the present embodiment, the digital signal processing circuit 5 can obtain the angular velocity $V_\Omega$ corresponding to the amplitude of the angular velocity signal $V_\Omega(t)$ by performing a digital process illustrated in FIG. 3.

At S1, the digital signal processing circuit 5 executes an initializing process. Then, the digital signal processing circuit 5 executes processes from S3 to S13 based on a timer interruption every predetermined time.

At S2, the digital signal processing circuit 5 determines whether there is a timer interruption. If the digital signal processing circuit 5 determines that there is not a timer interruption, corresponding to "NO" at S2, the digital signal processing circuit 5 repeats the determination at S2 every predetermined time. If the digital signal processing circuit 5 determines that there is a timer interruption, corresponding to "YES" at S2, the process proceeds to S3. At S3, the digital signal processing circuit 5 receives the monitoring direct-current voltage Vmd corresponding to the amplitude of the monitoring signal Vm(t) and the sensing direct-current voltage Vsd corresponding to the amplitude of the sensing signal Vs(t). At S4, the digital signal processing circuit 5 detects a rising time of the comparison signal Vmc of the comparator 16 and a rising time of the comparison signal Vsc of the comparator 22. That is, the digital signal processing circuit 5 detects a time when the comparison signal Vmc of the comparator 16 transits from the low level to the high level and a time when the comparison signal Vsc of the comparator 22 transits from the low level to the high level. At S5, the digital signal processing circuit 5 calculates a time ΔT between the rising time of the comparison signal Vsc and the rising time of the comparison signal Vmc as illustrated in FIG. 4B and FIG.

4D. Because the digital signal processing circuit 5 calculates the time $\Delta T$ from the rising times of the comparison signals Vmc and Vsc, the digital signal processing circuit can calculate the time $\Delta T$ with a high degree of accuracy.

At S6, the digital signal processing circuit 5 calculates an actual driving frequency "fd" by calculating the reciprocal of a frequency of the comparison signal Vmc of the comparator 16 as shown by "fd=1/T" in FIG. 4B. At S7 and S8, the digital signal processing circuit 5 determines whether the digital signal processing circuit 5 receives abnormal values of the monitoring direct-current voltage Vmd and the sensing direct-current voltage Vsd.

At S7, the digital signal processing circuit 5 calculates the absolute value of a difference between the monitoring direct-current voltage Vmd and a predetermined value Vmd0 and the absolute value of a difference between the sensing direct-current voltage Vsd and a predetermined value Vsd0. If the absolute value of the difference between the monitoring direct-current voltage Vmd and the predetermined value Vmd0 is less than a predetermined value A and the absolute value of the difference between the sensing direct-current voltage Vsd and the predetermined value Vsd0 is less than a predetermined value B, the digital signal processing circuit 5 determines that a determination result at S7 is "YES," and the process proceeds to S8.

The predetermined value Vmd0 and the predetermined value Vsd0 respectively express an amplitude of the monitoring signal Vm(t) and an amplitude of the sensing signal Vs(t) detected on a predetermined condition (driving frequency "fd0") at a time when a sensitivity is adjusted during manufacturing of the vibrating body 2.

At S8, the digital signal processing circuit 5 calculates the absolute value of a difference between the time $\Delta T$ calculated at S5 and a predetermined time T0 and the absolute value of a difference between the actual driving frequency "fd" calculated at S6 and a predetermined frequency "fd0." If the absolute value of the difference between the time $\Delta T$ and the predetermined time T0 is less than a predetermined value C and the absolute value of the difference between the actual driving frequency "fd" and the predetermined frequency "fd0" is less than a predetermined value D, the digital signal processing circuit 5 determines that a determination result at S8 is "YES," and the process proceeds to S9.

If the determination result of one of S7 and S8 is "NO," the process proceeds to S11. At S11, the digital signal processing circuit 5 increments a variable CONT and counts the number of errors. At S12, the digital signal processing circuit 5 determines whether the variable CONT is greater than an error upper limit E. If the digital signal processing circuit 5 determines that the variable CONT is less than or equal to the error upper limit E, corresponding to "NO" at S12, the process returns to S2. That is, if a substantial gap from the values obtained at a time when the sensitivity is adjusted generates, the determination result of one of S7 and S8 becomes "NO," and the process from S2 is repeated. If the digital signal processing circuit 5 determines that the variable CONT is greater than the error upper limit E, corresponding to "YES" at S12, the process proceeds to S13. At S13, the digital signal processing circuit 5 outputs a diagnosis signal and the process ends.

At S9, the digital signal processing circuit 5 calculates the angular velocity $V_\Omega$ corresponding to the amplitude of the angular velocity signal $V_\Omega(t)$ as follows:

$$V_\Omega = (Vmd0/Vmd) \times (fd0/fd)^2 \times Vsd \times \sin(2\pi \cdot fd \cdot \Delta T) \quad (7).$$

At S10, the digital signal processing circuit 5 outputs the angular velocity $V_\Omega$ after treating the angular velocity $V_\Omega$ with a digital filtering process. When the angular velocity sensor 1 is used for controlling a vehicle, taking a behavior frequency of the vehicle into consideration, the digital signal processing circuit 5 may treat the angular velocity with a digital low pass filter (LPF) process of about 10 Hz as the digital filtering process.

In the present embodiment, a difference between a time when the monitoring signal Vm(t) crosses the first threshold voltage Vref1 and a time when the sensing signal Vs(t) detected corresponding to the monitoring signal Vm(t) crosses the second threshold voltage Vref2 is set as $\Delta T$, the monitoring direct-current voltage corresponding to the amplitude of the monitoring signal Vm(t) is set as Vmd, and the sensing direct-current voltage corresponding to the amplitude of the sensing signal Vs(t) is set as Vsd, and the digital signal processing circuit 5 calculates the angular velocity $V_\Omega$ from formula (7). Thus, the angular velocity sensor 1 can calculate the angular velocity signal $V_\Omega(t)$ with a low-speed process compared with a conventional angular velocity sensor that calculates the angular velocity signal $V_\Omega(t)$ by a high-speed analog-digital conversion of the monitoring signal Vm(t) and the sensing signal Vs(t) at a predetermined sampling frequency. Therefore, the angular velocity sensor 1 does not require a high-speed analog-digital converter. In addition, because the time $\Delta T$ is calculated using the comparators 16 and 22, the time $\Delta T$ can be calculated with a simple configuration. Thus, the angular velocity sensor 1 does not require a complicated high-speed analog-digital converter.

(Other Embodiments)

Although the present invention has been fully described in connection with the exemplary embodiments thereof with reference to the accompanying drawings, it is to be noted that various changes and modifications will become apparent to those skilled in the art.

The vibrating body 2 may also have a configuration other than the configuration illustrated in FIG. 2 that is provided by attaching two wafers. For example, the vibrating body 2 may have a tuning-fork shape. The angular velocity sensor is not limited to an electrostatic capacity type.

In order to detect the monitoring direct-current voltage, the detecting circuit 15 may include a circuit for detecting a direct-current voltage corresponding to the amplitude of the monitoring signal Vm(t) by averaging the voltage of the monitoring signal Vm(t) through a circuit combining a full-wave rectifier circuit and a low pass filter. Alternatively, the detecting circuit 15 may include a circuit for detecting a root mean square (RMS) value of the vibration monitoring signal. The detecting circuit 21 may have a configuration similar to the detecting circuit 15.

In the present application, it is assumed that each of the sensing direct-current voltage Vsd and the monitoring direct-current voltage Vmd has a constant value. However, for a period longer than a period described above, for example, a period illustrated in FIG. 4, especially the sensing direct-current voltage Vsd changes with time in accordance with, for example, an applied angular velocity. Thus, for example, in the sensing direct-current voltage Vsd, "direct-current" means that the sensing direct-current voltage Vsd is close to a direct current compared with a change in the sensing signal Vs(t) for a period longer than or equal to the frequency of the sensing signal Vs(t), that is, a frequency of the sensing direct-current voltage Vsd is lower than the frequency of the sensing signal Vs(t).

Each process performed by the digital signal processing circuit 5 may be changed as necessary. For example, during the process S9, at least one of multiplying adjusting processes of formula (Vmd0/Vmd) and formula (fd0/fd)² can be omitted. The above-described multiplying adjusting process may be performed, for example, when the angular velocity sensor 1 calculates the angular velocity $V_\Omega$ with a high accuracy for adjusting a temperature.

In the above-described embodiment, the digital signal processing circuit 5 sets the difference between the rising time of the comparison signal Vmc of the comparator 16 and the rising time of the comparison signal Vsc of the comparator 22 as the time ΔT during the process at S5 and substitutes the time ΔT into formula (7) during the process at S9. Alternatively, the digital signal processing circuit 5 may set a difference between a falling time of the comparison signal Vmc of the comparator 16 and a falling time of the comparison signal Vsc of the comparator 22 as a time ΔT and may substitute the time ΔT into formula (7) during the process at S9.

Alternatively, the digital signal processing circuit 5 may use the rising time of the comparison signal Vmc and the falling time of the comparison signal Vsc and the digital signal processing circuit 5 may use the falling time of the comparison signal Vmc and the rising time of the comparison signal Vsc. In the above-described embodiment, each of the first threshold voltage Vref1 as the first reference level and the second threshold voltage Vref2 as the second reference level is set to be 2.5 V. However, each of the first reference level and the second reference level may be set to be a different value. A magnitude relation between the first reference level and the second reference level is not limited.

What is claimed is:

1. A method of detecting an angular velocity of a vibration angular velocity sensor that is configured to detect the angular velocity by vibrating a vibrating body in a first direction and detecting a displacement of the vibrating body in a second direction crossing the first direction, the method comprising:
    setting a difference in time between a feature point where a vibration monitoring signal Vm(t) sensing a displacement of the vibrating body in the first direction crosses a first reference level and a feature point where a sensing signal Vs(t) sensing a displacement of the vibrating body in the second direction crosses a second reference level as ΔT;
    setting a sensing direct-current voltage corresponding to an amplitude of the sensing signal Vs(t) as Vsd;
    setting a driving frequency as fd; and
    calculating the angular velocity $V_\Omega$ from a formula of $$V_\Omega = Vsd \times \sin(2\cdot\pi\cdot fd\cdot\Delta T) \quad (1).$$

2. The method of detecting the angular velocity of the vibration angular velocity sensor according to claim 1, further comprising:
    setting a monitoring direct-current voltage corresponding to an amplitude of the vibration monitoring signal Vm(t) as Vmd;
    setting a driving frequency at a time when a sensitivity is previously adjusted as fd0, and
    setting a monitoring direct-current voltage at the time when the sensitivity is previously adjusted as Vmd0, wherein
    the angular velocity $V_\Omega$ is calculated by multiplying the formula (1) by formula of (Vmd0/Vmd).

3. The method of detecting the angular velocity of the vibration angular velocity sensor according to claim 1, further comprising:
    setting a monitoring direct-current voltage corresponding to an amplitude of the vibration monitoring signal Vm(t) as Vmd;
    setting a driving frequency at a time when a sensitivity is previously adjusted as fd0; and
    setting a monitoring direct-current voltage at the time when the sensitivity is previously adjusted as Vmd0, wherein
    the angular velocity $V_\Omega$ is calculated by multiplying the formula (1) by formula of (fd0/fd)².

4. The method of detecting the angular velocity of the angular velocity sensor according to claim 1, further comprising:
    setting a monitoring direct-current voltage corresponding to an amplitude of the vibration monitoring, signal Vm(t) as Vmd;
    setting a monitoring direct-current voltage at a time when a sensitivity is previously adjusted as Vmd0; and
    setting a driving frequency at a time when the sensitivity is previously adjusted as fd0, wherein
    the angular velocity $V_\Omega$ is calculated by multiplying the formula (1) by formula of (Vmd0/Vmd) and formula of (fd0/fd)².

* * * * *